United States Patent
Avasarala et al.

(10) Patent No.: US 9,350,844 B2
(45) Date of Patent: May 24, 2016

(54) MECHANISM OF PROVIDING INFORMATION TO CALLER BY TEMPORARILY PAUSING THE CALL INITIATION REQUEST

(75) Inventors: Ranjit Avasarala, Bangalore (IN); Samir Dilipkumar Saklikar, Bangalore (IN); Subir Saha, Bangalore (IN)

(73) Assignee: Google Technology Holdings LLC, Mountain View, CA (US)

(*) Notice: Subject to any disclaimer, the term of this patent is extended or adjusted under 35 U.S.C. 154(b) by 669 days.

(21) Appl. No.: 12/340,943

(22) Filed: Dec. 22, 2008

(65) Prior Publication Data

US 2010/0159915 A1   Jun. 24, 2010

(51) Int. Cl.
*H04Q 7/00*   (2006.01)
*H04M 1/56*   (2006.01)
*H04M 1/725*   (2006.01)

(52) U.S. Cl.
CPC ............ *H04M 1/56* (2013.01); *H04M 1/72519* (2013.01)

(58) Field of Classification Search
CPC ................... H04W 28/0231; H04W 28/0236; H04W 4/24; H04M 245/42; H04M 245/44
USPC ............. 455/422.1, 425, 416, 418, 405, 406, 455/408, 426, 74.1; 709/206, 224, 227, 228
See application file for complete search history.

(56) References Cited

U.S. PATENT DOCUMENTS

| | | | |
|---|---|---|---|
| 6,665,535 B1 | 12/2003 | Miura et al. | |
| 7,242,421 B2 | 7/2007 | Center, Jr. et al. | |
| 7,263,545 B2* | 8/2007 | Digate et al. | 709/206 |
| 8,077,653 B2* | 12/2011 | Kuure et al. | 370/328 |
| 8,761,154 B2* | 6/2014 | Altberg et al. | 370/352 |
| 2002/0061099 A1* | 5/2002 | Hayashi et al. | 379/211.02 |
| 2002/0193107 A1* | 12/2002 | Nascimento, Jr. | 455/426 |
| 2003/0032414 A1 | 2/2003 | Melaku et al. | |
| 2007/0206496 A1* | 9/2007 | Roy et al. | 370/229 |

* cited by examiner

*Primary Examiner* — Patrick Edouard
*Assistant Examiner* — Julio Perez

(57) ABSTRACT

A method, a network base station, and a user device for pausing a communication connection initiation are disclosed. A processor 210 may begin a communication connection initiation between an origin user device and a target user device. The processor 210 may pause the communication connection initiation. A transceiver 240 may receive a connection action request to execute a connection action.

20 Claims, 13 Drawing Sheets

400

*600*

MECHANISM OF PROVIDING INFORMATION TO CALLER BY TEMPORARILY PAUSING THE CALL INITIATION REQUEST

BACKGROUND OF THE INVENTION

1. Field of the Invention

The present invention relates to a method and system for creating a call connection. The present invention further relates to pausing an attempt to make a call connection.

2. Introduction

A user seeking to call another user may use a cellular network. A first user may make the call using an origin user device and a second user may receive the call using a target user device. The origin user device may contact a network server to access the network. The network server, upon request from the origin user device, may initiate a connection with the target user device. The origin user device may cancel the connection request, or proceed with the call.

SUMMARY OF THE INVENTION

A method, a network base station, and a user device for pausing a communication connection initiation are disclosed. A processor may begin a communication connection initiation between an origin user device and a target user device. The processor may pause the communication connection initiation. A transceiver may receive a connection action request to execute a connection action.

BRIEF DESCRIPTION OF THE DRAWINGS

Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE INVENTION

Additional features and advantages of the invention will be set forth in the description which follows, and in part will be obvious from the description, or may be learned by practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth herein.

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

The present invention comprises a variety of embodiments, such as a method, an apparatus, and an electronic device, and other embodiments that relate to the basic concepts of the invention. The electronic device may be any manner of computer, mobile device, or wireless communication device.

A method, a network base station, and a user device for pausing a communication connection initiation are disclosed. A processor may begin a communication connection initiation between an origin user device and a target user device. The processor may pause the communication connection initiation. A transceiver may receive a connection action request to execute a connection action.

Figure 1:
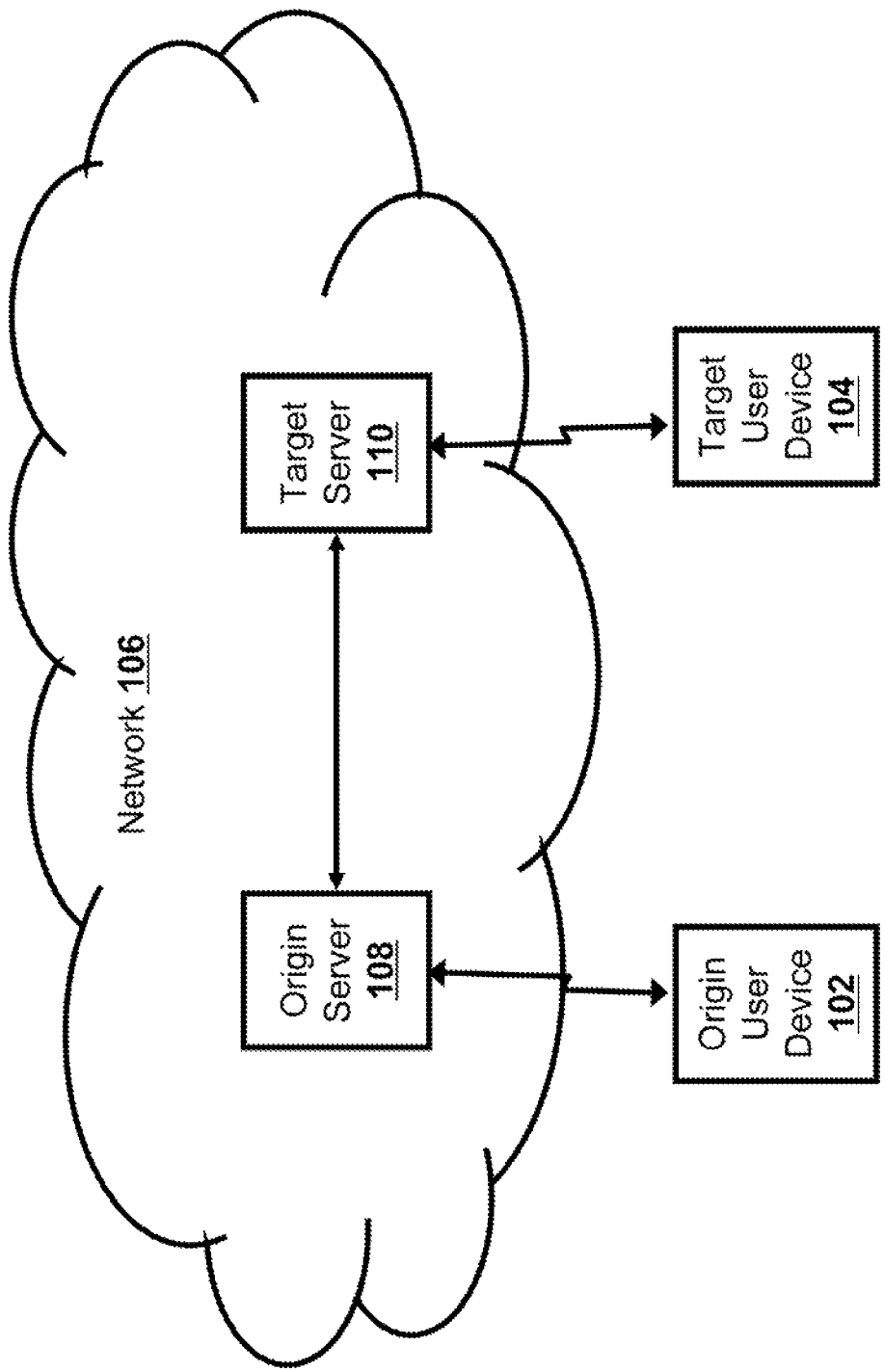
FIG. 1 illustrates one embodiment of a communication system.

FIG. 1 illustrates one embodiment of a communication system 100. A user may use an origin user device 102 to contact a user with a target user device 104 via a network 106. The origin user device 102 may access the network 106 via an origin server 108. The origin server 108 may send a communication connection initiation request to a target server 110. The communication connection may be a text session, an instant messaging session, a voice session, an audio-video session, or any other communication connection. The target server 110 may complete a communication connection initiation between the target user device 104 and the origin user device 102. The origin server 108 may also act as target server 110 during a different communication event, and vice versa. The origin user device 102 may also act as target user device 104 during a different communication event, and vice versa.

Figure 2:
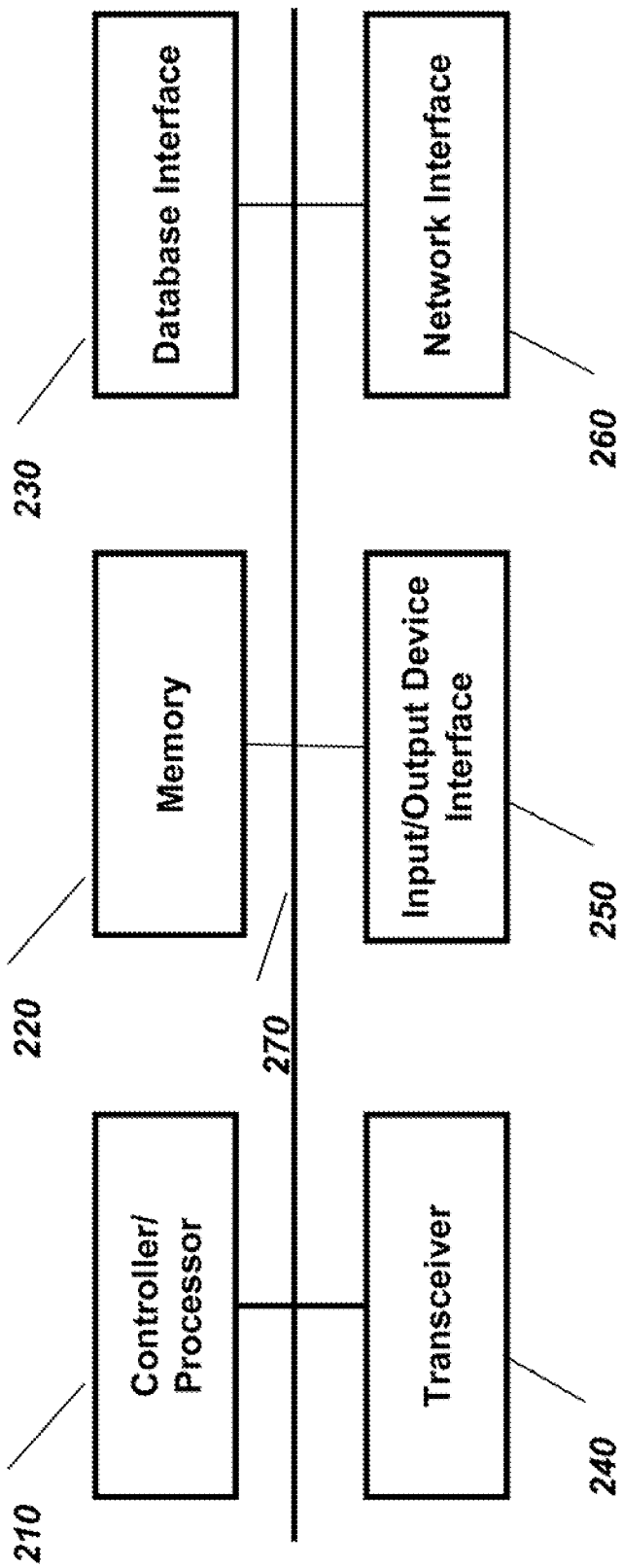
FIG. 2 illustrates a possible configuration of a computing system to act as a network server.

FIG. 2 illustrates a possible configuration of a computing system to act as a network server 200. The network server may be either an origin server 108 or a target server 110. The network server 200 may include a controller/processor 210, a memory 220, a database interface 230, a transceiver 240, input/output (I/O) device interface 250, and a network interface 260, connected through bus 270. The network server 200 may implement any operating system. Client and server software may be written in any programming language, such as C, C++, Java or Visual Basic, for example. The server software may run on an application framework, such as, for example, a Java® server or .NET® framework The controller/processor 210 may be any programmed processor known to one of skill in the art. However, the decision support method may also be implemented on a general-purpose or a special purpose computer, a programmed microprocessor or microcontroller, peripheral integrated circuit elements, an application-specific integrated circuit or other integrated circuits, hardware/electronic logic circuits, such as a discrete element circuit, a programmable logic device, such as a programmable logic array, field programmable gate-array, or the like. In general, any device or devices capable of implementing the decision support method as described herein may be used to implement the decision support system functions of this invention.

The memory 220 may include volatile and nonvolatile data storage, including one or more electrical, magnetic or optical memories such as a random access memory (RAM), cache, hard drive, or other memory device. The memory may have a cache to speed access to specific data. The memory 220 may also be connected to a compact disc-read only memory (CD-ROM), digital video disc-read only memory (DVD-ROM), DVD read write input, tape drive, or other removable memory device that allows media content to be directly uploaded into the system.

Data may be stored in the memory or in a separate database. The database interface 230 may be used by the controller/processor 210 to access the database. The database may contain any formatting data to connect an origin user device 102 or a target user device 104 to the network 106.

The transceiver 240 may create a data connection with the origin user device 102 and the target user device 104. The transceiver 240 may be incorporated into the network server or may be a part of a base station connected to the network server 200.

The I/O device interface 250 may be connected to one or more input devices that may include a keyboard, mouse, pen-operated touch screen or monitor, voice-recognition device, or any other device that accepts input. The I/O device interface 250 may also be connected to one or more output devices, such as a monitor, printer, disk drive, speakers, or any other device provided to output data. The I/O device interface 250 may receive a data task or connection criteria from a network administrator.

The network connection interface 260 may be connected to a communication device, modem, network interface card, a transceiver, or any other device capable of transmitting and receiving signals from the network 106. The network connection interface 260 may be used to connect a client device to a network. The network connection interface 260 may be used to connect the teleconference device to the network connecting the user to other users in the teleconference. The components of the network server 200 may be connected via an electrical bus 270, for example, or linked wirelessly.

Client software and databases may be accessed by the controller/processor 210 from memory 220, and may include, for example, database applications, word processing applications, as well as components that embody the decision support functionality of the present invention. The network server 200 may implement any operating system. Client and server software may be written in any programming language. Although not required, the invention is described, at least in part, in the general context of computer-executable instructions, such as program modules, being executed by the electronic device, such as a general purpose computer. Generally, program modules include routine programs, objects, components, data structures, etc. that perform particular tasks or implement particular abstract data types. Moreover, those skilled in the art will appreciate that other embodiments of the invention may be practiced in network computing environments with many types of computer system configurations, including personal computers, hand-held devices, multi-processor systems, microprocessor-based or programmable consumer electronics, network PCs, minicomputers, mainframe computers, and the like.

Figure 3:
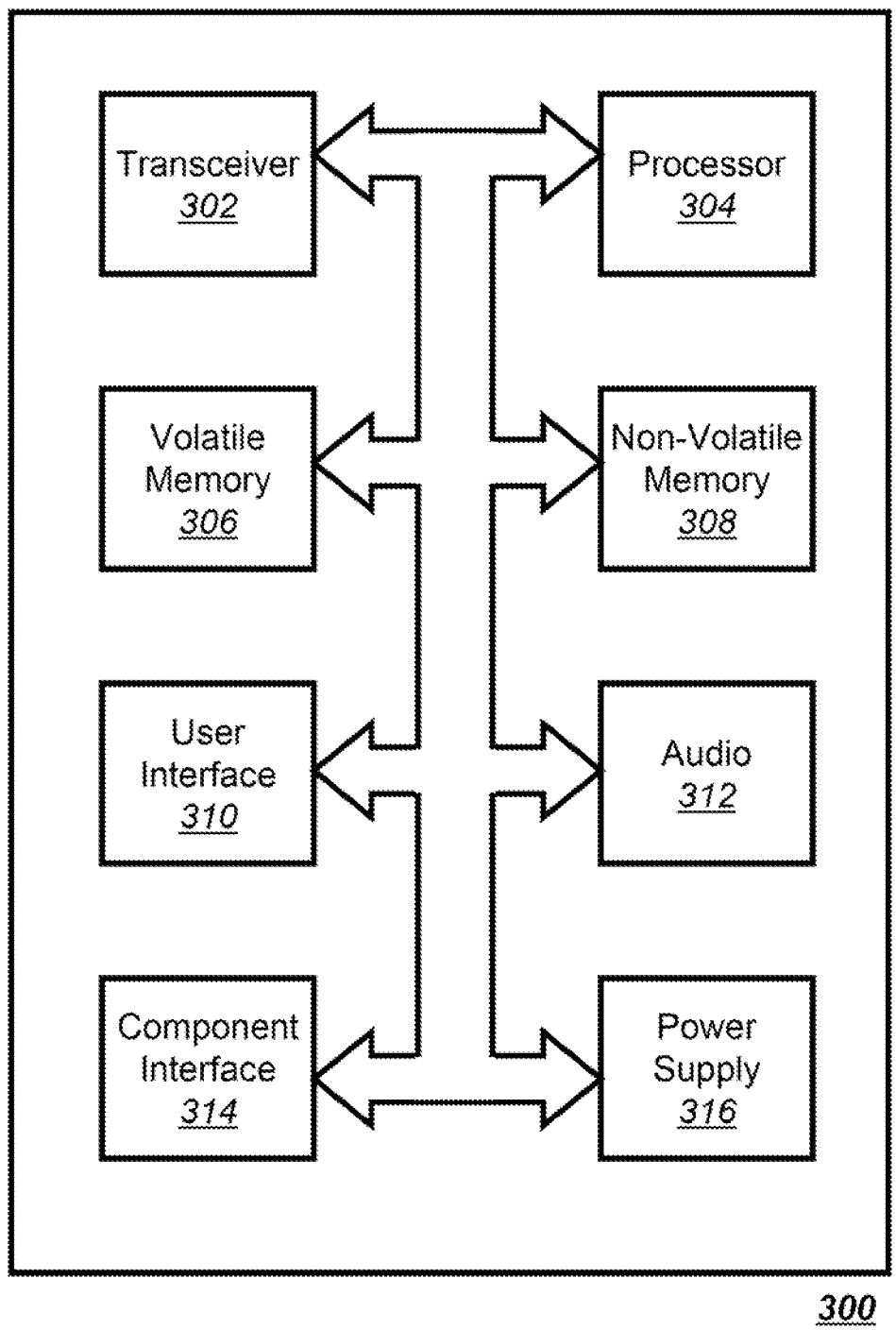
FIG. 3 illustrates in a block diagram one embodiment of a user device.

FIG. 3 illustrates in a block diagram one embodiment of a user communication device 300, or terminal, capable of acting as either an origin user device 102 or a target user device 104. The user device 300 may be capable of accessing the information or data stored in the network 106. For some embodiments of the present invention, the user device 300 may also support one or more applications for performing various communications with the network 106. The user device 300 may be a handheld device, such as, a mobile phone, a laptop, or a personal digital assistant (PDA). For some embodiments of the present invention, the user device 300 may be WiFi® capable device, which may be used to access the network 106 for data or by voice using VOIP.

The user device 300 may include a transceiver 302, which is capable of sending and receiving data over the network 106. The user device 300 may include a processor 304 that executes stored programs. The user device 300 may also include a volatile memory 306 and a non-volatile memory 308 which are used by the processor 304. The user device 300 may include a user input interface 310 that may comprise elements such as a keypad, display, touch screen, and the like. The user device 300 may also include a user output device that may comprise a display screen and an audio interface 312 that may comprise elements such as a microphone, earphone, and speaker. The user device 300 also may include a component interface 314 to which additional elements may be attached, for example, a universal serial bus (USB) interface. Finally, the user device 300 may include a power supply 316.

Figure 4:
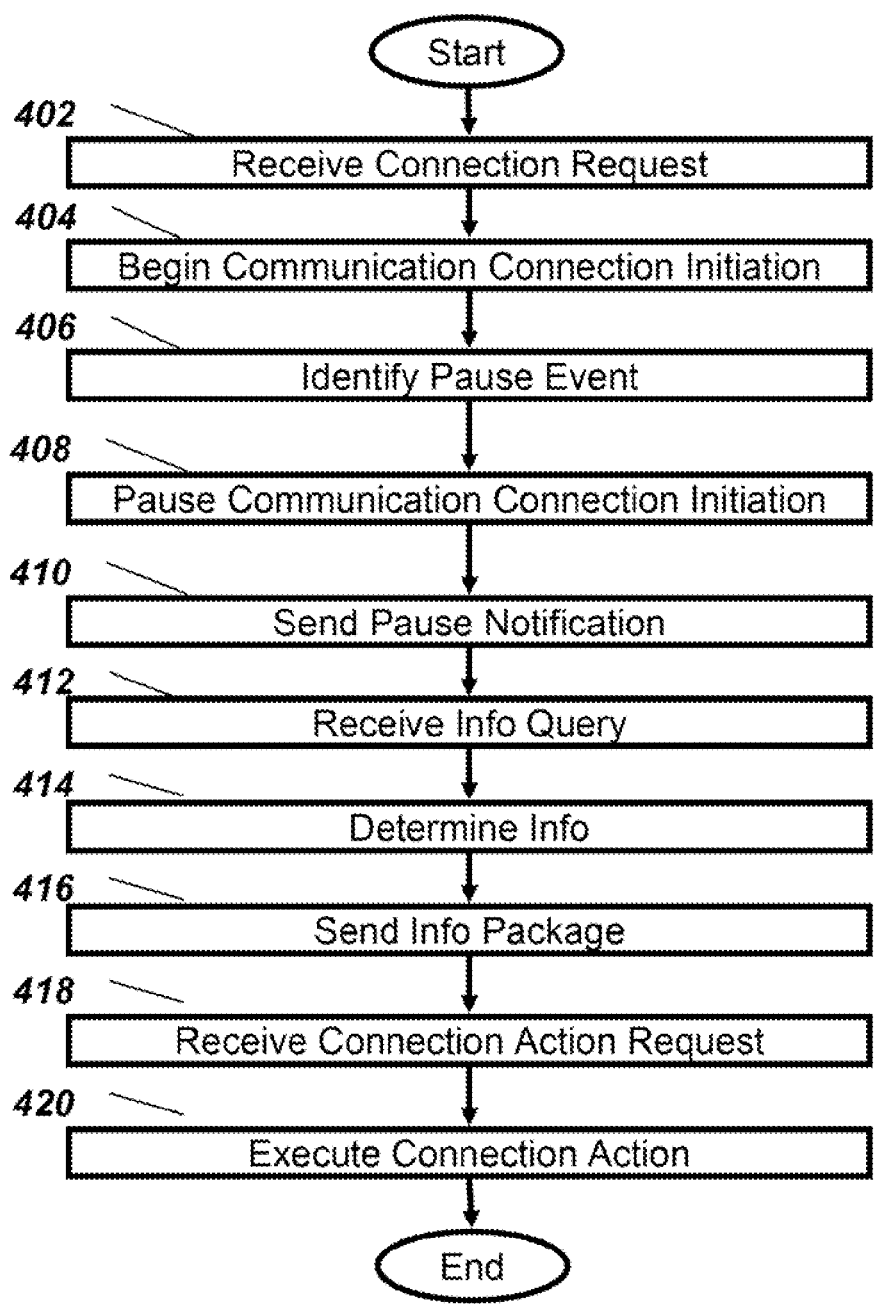
FIG. 4 illustrates, in a flowchart, one method of processing a communication connection request in a network server.

FIG. 4 illustrates, in a flowchart, one method 400 of processing a communication connection request in an origin server 108. The origin server 108 may receive a communication connection request from the origin user device 102 (Block 402). The origin server 108 may begin the communication connection initiation (Block 404). The origin server 108 may identify a pause event (Block 406). The pause event may be a pause request from the origin user device 102. Alternately, the pause event may be a user rule, representing a previously stored request of the user of the origin user device 102, requesting that the communication connection initiation be paused to perform a specific task. The origin server 108 may pause the communication connection initiation based on the pause event (Block 408). The origin server 108 may send a user alert, such as a pause notification, to the origin user device 102 (Block 410). The origin server 108 may receive an information query from the origin user device 102 (Block 412). The information query may regard a pricing plan for the communication connection, a device characteristic associated with the target user device 104, a context of a user of the target user device 104, or other communication connection information. The origin server 108 may determine the information relevant to the information query (Block 414). The origin server 108 may send a user alert with the relevant information in an information package to the origin user device 102 (Block 416). The origin server 108 may receive a connection action request from the origin user device 102 (Block 418). The connection action request may direct the origin server 108 to execute a connection action, such as to progress the communication connection initiation, redirect the communication connection initiation, upgrade the communication connection initiation, cancel the communication connection initiation, or other connection action. The origin server 108 may execute the connection action (Block 420).

Figure 5:
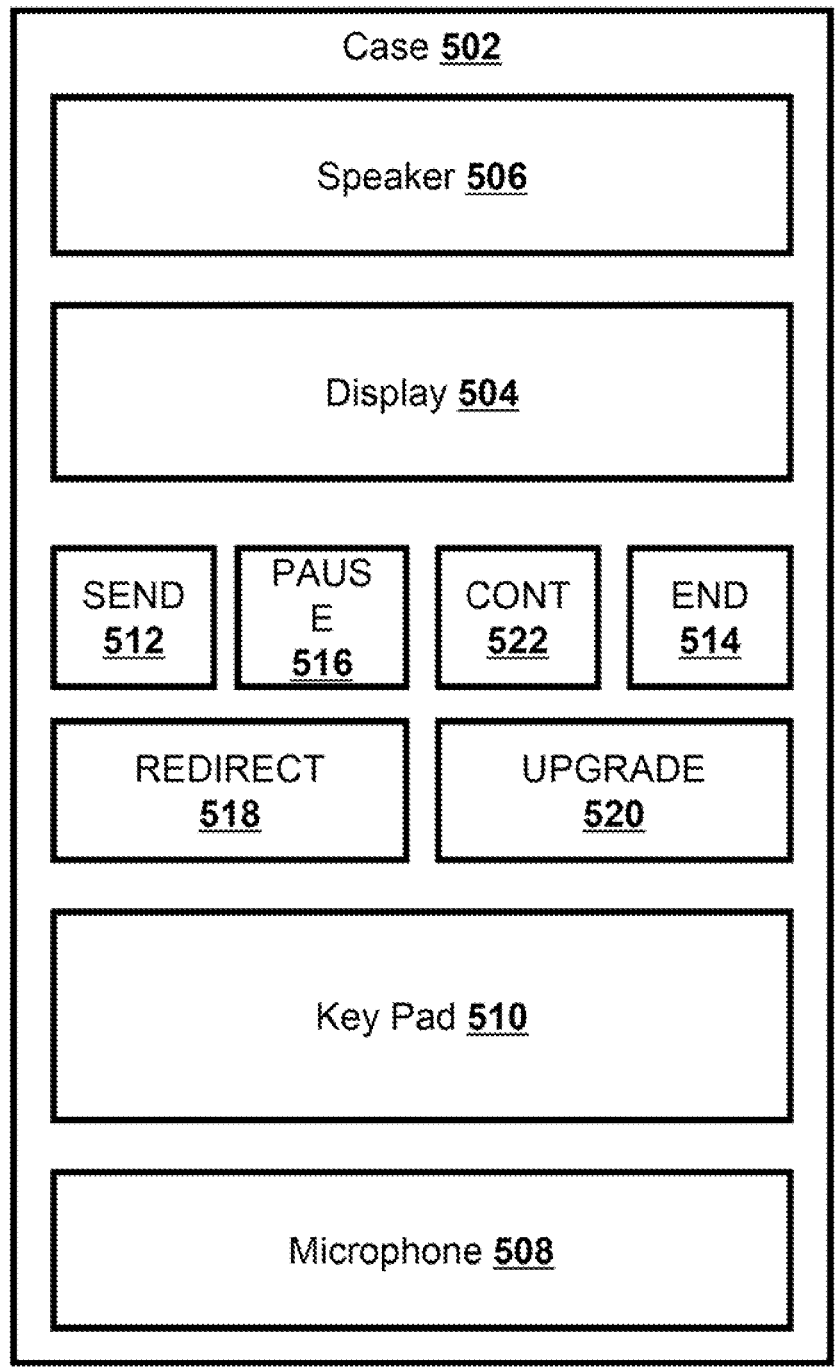
FIG. 5 illustrates, in a block diagram, a user interface for a user device.

FIG. 5 illustrates, in a block diagram, a user interface 500 for a user device 200. The case 502 of the user device 200 may support a display screen 504 to show visual data to the user, a speaker 506 to present audio to the user, a microphone 508 to receive audio data and commands from the user, a key pad 510 to receive text data and commands from the user, and other input or output devices. The user interface 500 may also have special function keys, such as a SEND key 512 to initiate a communication connection, an END key 514 to end a communication connection, a PAUSE key 516 to pause a communication connection initiation, a REDIRECT key 518 to redirect a communication connection to an alternate device associated with the user, an UPGRADE key 520 to change a communication connection by adding the next level of media, a CONT key 522 to continue a communication connection initiation that had been paused, and other special function keys.

Figure 6:
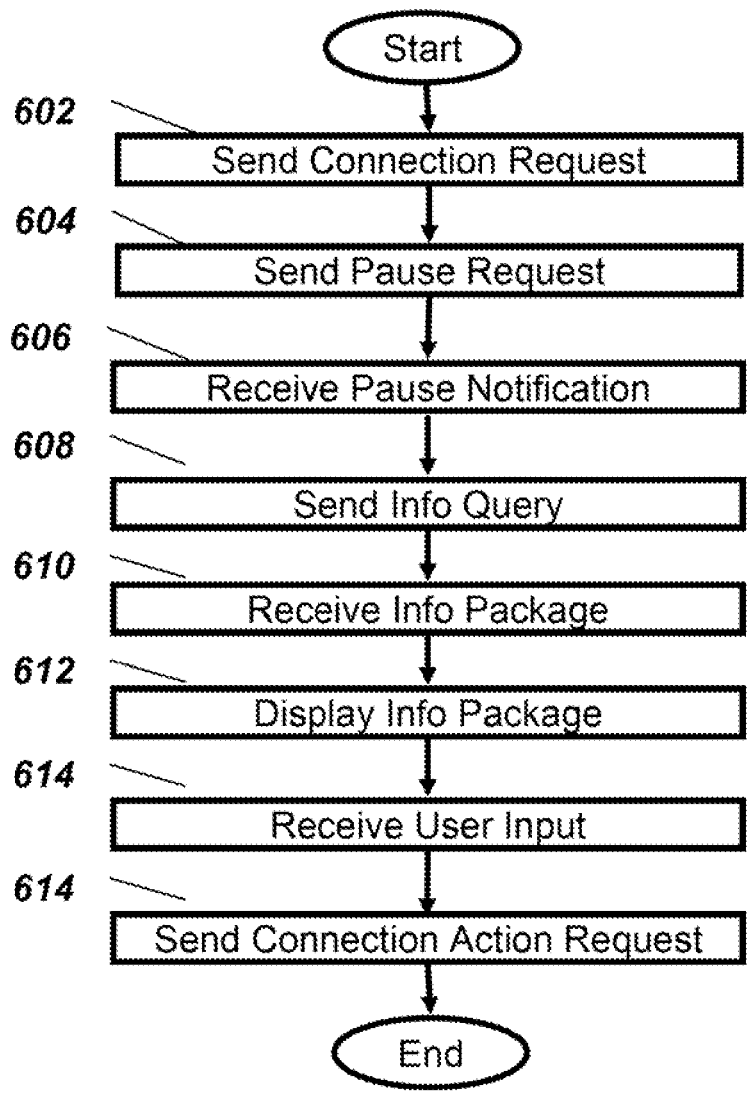
FIG. 6 illustrates, in a flowchart, one method of sending a communication connection request from a user device.

FIG. 6 illustrates, in a flowchart, one method 600 of sending a communication connection request from a user device. An origin user device 102 may send a communication connection request to an origin server 108 (Block 602). If a user decides that more information is needed or more time is needed, the origin user device 102 may send a pause request to the origin server 108 (Block 604). Once the origin server 108 has paused the connection communication initiation, the origin user device 102 may receive a pause notification (Block 606). The origin user device 102 may send an information query (Block 608). Alternately, the origin user device 102 may include the information query with the connection request, automatically signaling a pause request. Once the origin server 108 has gathered the requested information, the origin user device 102 may receive an information package containing the requested information (Block 610). The origin user device 102 may display the information package to the user, using the display 504 for visual or textual data or the speaker 506 for audio data (Block 612). Once the user has considered this new information, the origin user device 102 may receive a user input indicating a connection action (Block 614). The origin user device 102 may send a connection action request indicating the selected connection action to the origin server 108 (Block 616).

Figure 7:
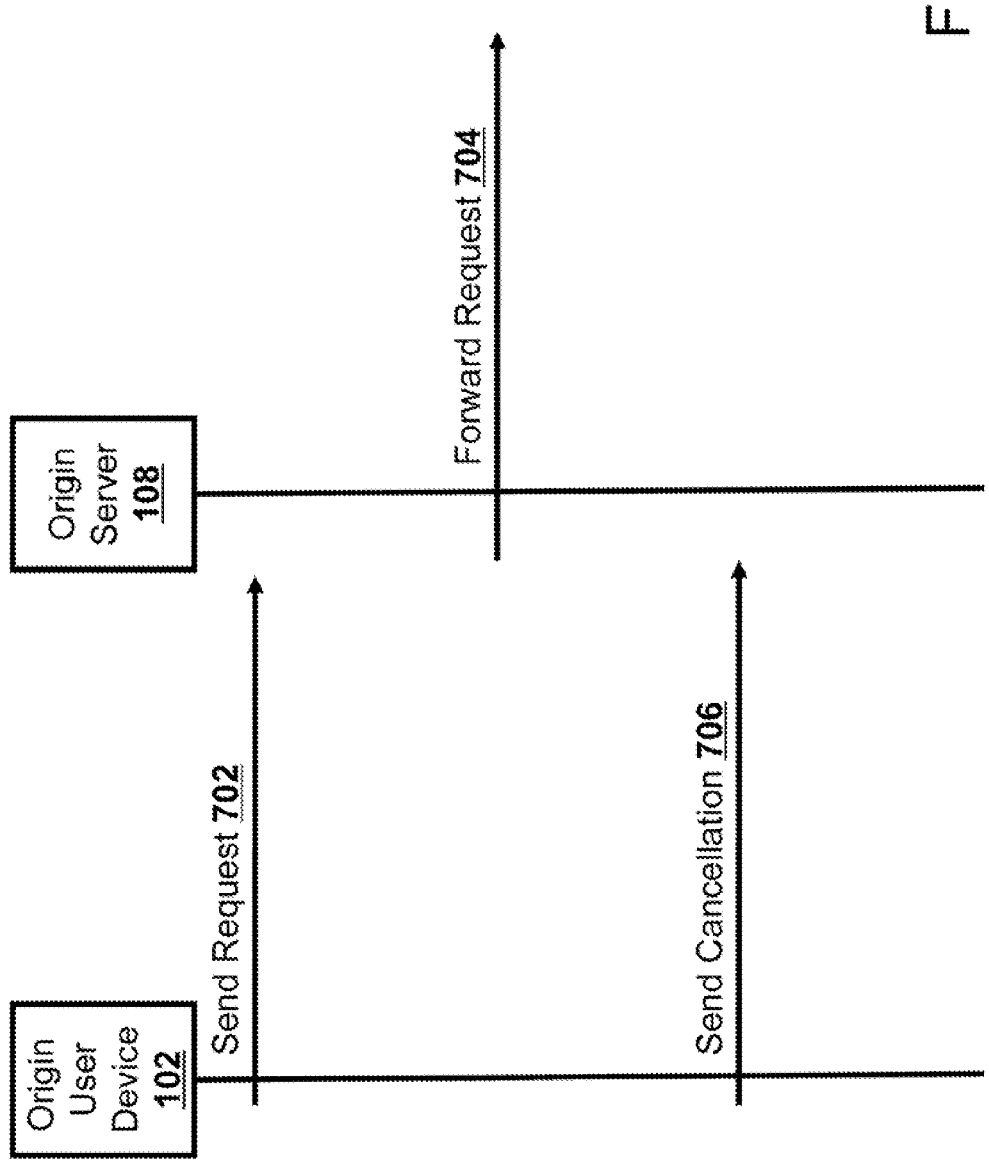
FIG. 7 illustrates, in a block flow diagram, one embodiment of a method for initiating and cancelling a communication connection.

FIG. 7 illustrates, in a block flow diagram, one embodiment of a method 700 for initiating and cancelling a communication connection. The origin user device 102 may send a communication connection initiation request to the origin server 108 for call processing (Action 702). The origin server 108 may authenticate and authorize the user, then forward the communication connection initiation request to the appropriate recipient (Action 704). If the user is unwilling to continue the call at that time, the origin user device 102 may send a cancellation request to the origin server 108 (Action 706). Once cancelled, all completed communication connection initiation actions may be lost. Prior to the present invention, the user may not have been able to pause the communication connection initiation and maintain the communication connection initiation actions that have been completed.

Figure 8:
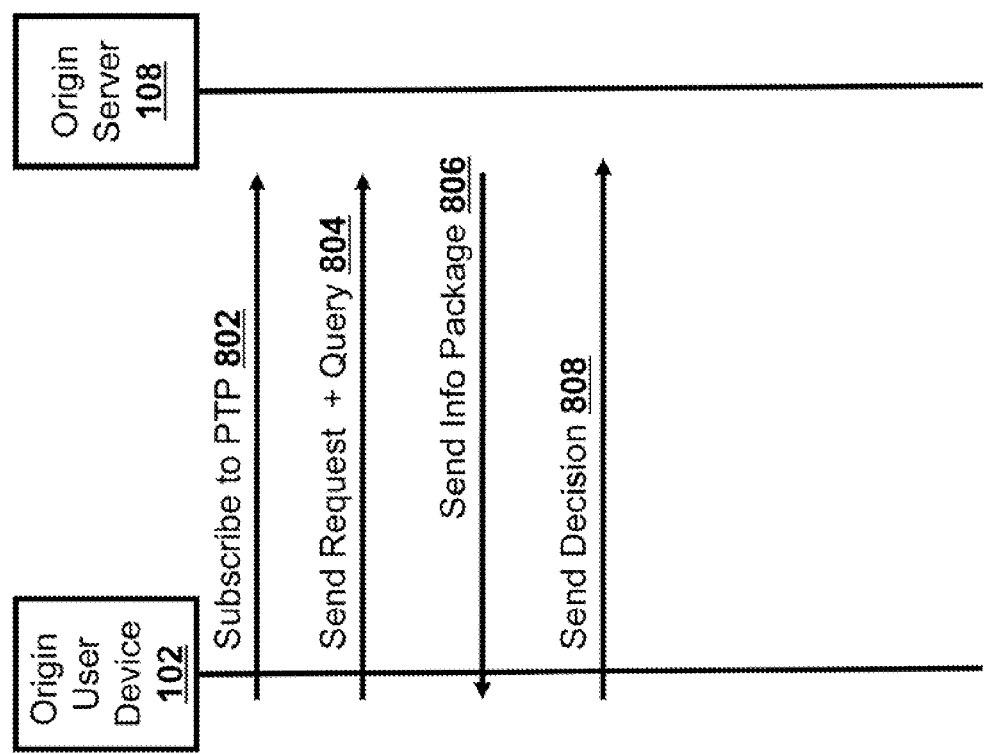
FIG. 8 illustrates, in a block flow diagram, one embodiment of a method for pausing a communication connection initiation.

FIG. 8 illustrates, in a block flow diagram, one embodiment of a method 800 for pausing a communication connection initiation. The origin user device 102 may subscribe to a push to pause (PTP) service (Action 802). With a push to pause service, an origin server 108 may temporarily pause processing a communication connection initiation and address a query by an origin user device 102. The origin user device 102 may send a communication connection initiation request to the origin server 108 (Action 804). The communication connection initiation request may include an information query. The origin user device 102 may have a rule in place that includes the information query as a standard query with every communication connection initiation request. Alternately, the user may choose to include the query on a case by case basis. In another embodiment, the user may send the query separately after sending a pause request. The information query may regard a pricing plan for the communication connection, a device characteristic associated with the target user device 104, a context of a user of the target user device 104, or other communication connection information. The origin server 108 may send information relevant to that information query in an information package to the origin user device 102 (Action 806). After reviewing the information in the information package, the origin user device 102 may send a decision to the origin server 108 (Action 808). The origin user device 102 may send the decision in response to a user input or based on a preset based of decision criteria. The decision criteria may be a default set of decision criteria or a set of decision criteria decided by the user.

Figure 9:
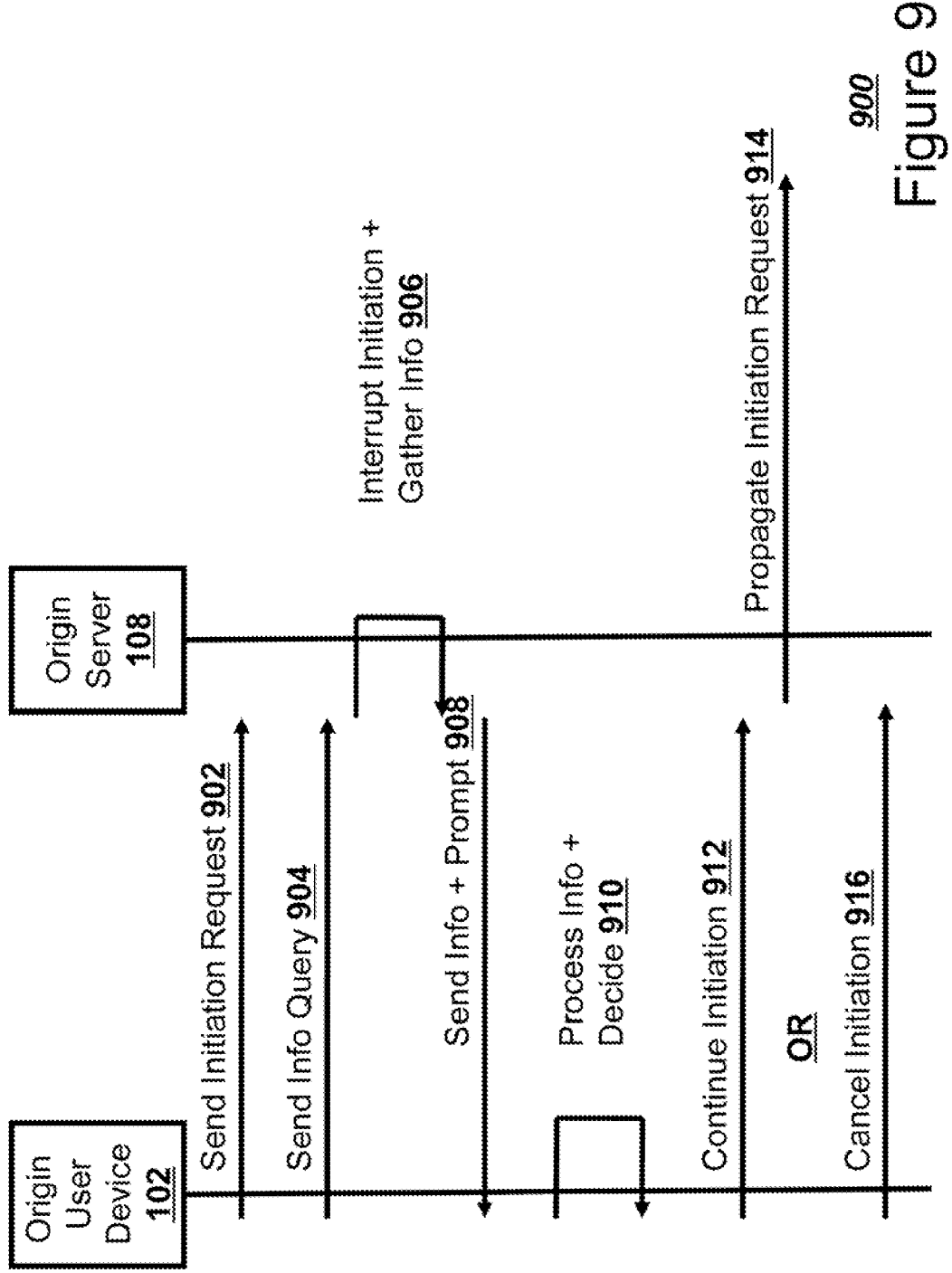
FIG. 9 illustrates, in a block flow diagram, one embodiment of a method for gathering information during a paused communication connection initiation.

FIG. 9 illustrates, in a block flow diagram, one embodiment of a method 900 for gathering information during a paused communication connection initiation. The origin user device 102 may send a communication connection initiation request to the origin server 108 (Action 902). The origin user device 102 may send the information query to an origin server 108 (Action 904). The information query may regard a pricing plan for the communication connection, a device characteristic associated with the target user device 104, a context of a user of the target user device 104, or other communication connection information. The origin server 108 may interrupt the communication connection initiation upon the information query and gather the information for the information query (Action 906). The origin server 108 may send information relevant to that information query in an information package, along with a decision prompt, to the origin user device 102 (Action 908). The origin user device 102 may process the information in the information package and may make a decision with regards to the communication connection initiation (Action 910). The origin user device 102 may make the decision in response to a user input or based on a preset based of decision criteria. The decision criteria may be a default set of decision criteria or a set of decision criteria decided by the user. The origin user device 102 may send a continuation request to the origin server 108 (Action 912). The origin server 108 may forward the communication connection initiation request to the appropriate recipient (Action 914). Alternately, the origin user device 102 may send a cancellation request to the origin server 108 (Action 916).

Figure 10:
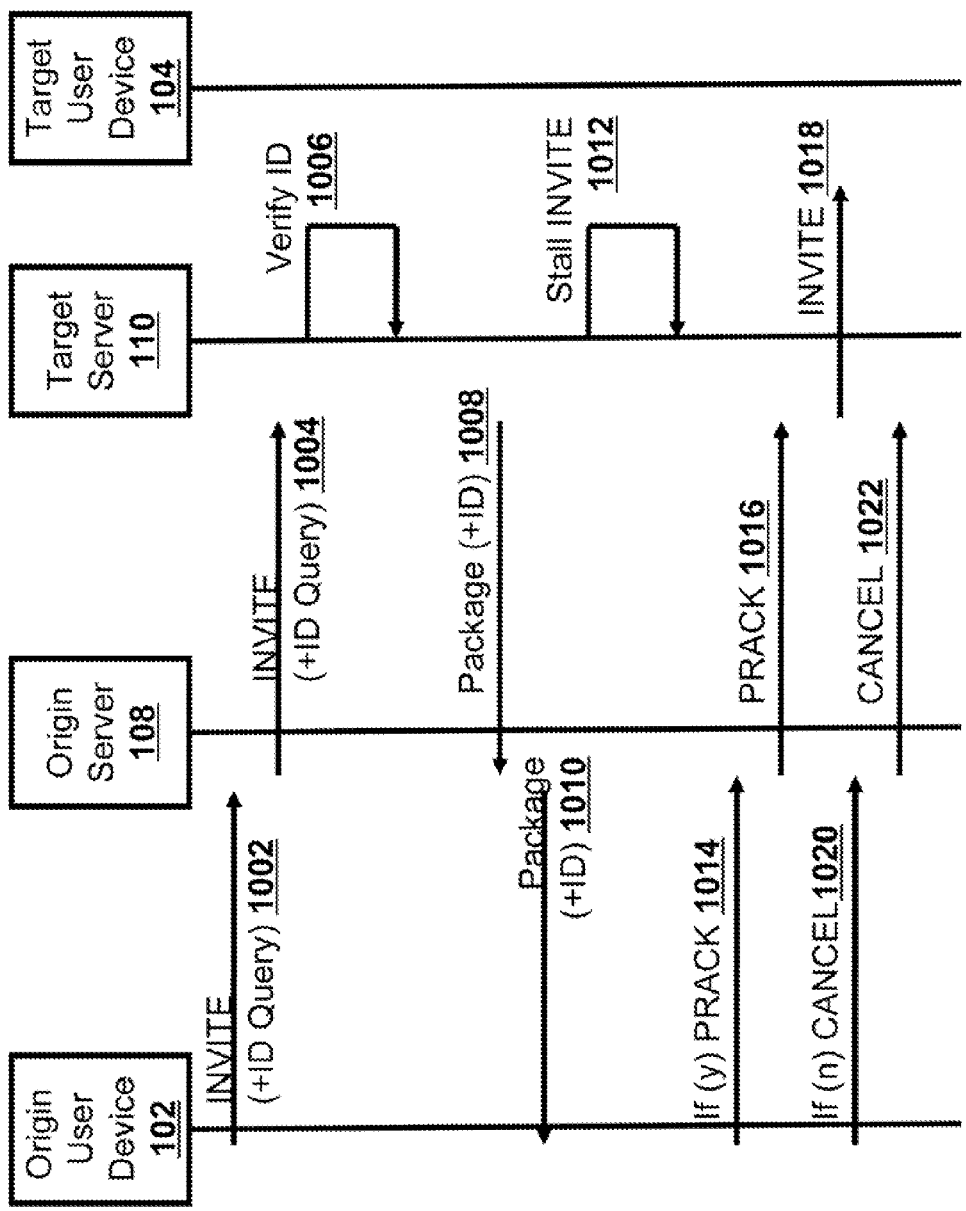
FIG. 10 illustrates, in a block flow diagram, one embodiment of a method for verifying identification during a paused communication connection initiation.

FIG. 10 illustrates, in a block flow diagram, one embodiment of a method 1000 for verifying identification during a paused communication connection initiation. The user devices 300 and the network servers 200 may interact using session initiation protocol (SIP). The origin user device 102 may send a communication connection initiation request, or INVITE request, to the origin server 108 (Action 1002). The communication connection initiation request may include an identification (ID) query. The origin user device 102 may have a rule in place that includes the ID query as a standard query with every INVITE request. Alternately, the user may choose to include the ID query on a case by case basis. In another embodiment, the origin user device 102 may send the ID query separately after sending a pause request. The origin 108 server may forward the INVITE request and ID query to the target server 110 (Action 1004). The target server 110 may verify the ID of the target user device 104 (Action 1006). The target server 110 may send the verified ID of the target user device 104 in an information package to the origin server 108 (Action 1008). The origin server 108 may forward the information package to the origin user device 102 (Action 1010). Concurrently, the target server 110 may stall the processing of the INVITE request (Action 1012). After reviewing the information in the information package, the origin user device 102 may send a decision to the origin server 108. The origin user device 102 may send the decision in response to a user input or based on a preset based of decision criteria. The decision criteria may be a default set of decision criteria, a set of decision criteria decided by the user, or other decision criteria. If the origin user device 102 approves of the verified ID of the information package, the origin user device 102 may send a provisional response acknowledgement, or PRACK, to the origin server 108 (Action 1014). The origin server 108 may forward the PRACK to the target server 110 (Action 1016). The target server 110 may forward the INVITE request to the target user device 104 (Action 1018). If the origin user device 102 disapproves of the verified ID of the information package, the origin user device 102 may send a cancellation request, or CANCEL request, to the origin server 108 (Action 1020). The origin server 108 may forward the CANCEL request to the target server 110 (Action 1022).

Figure 11:
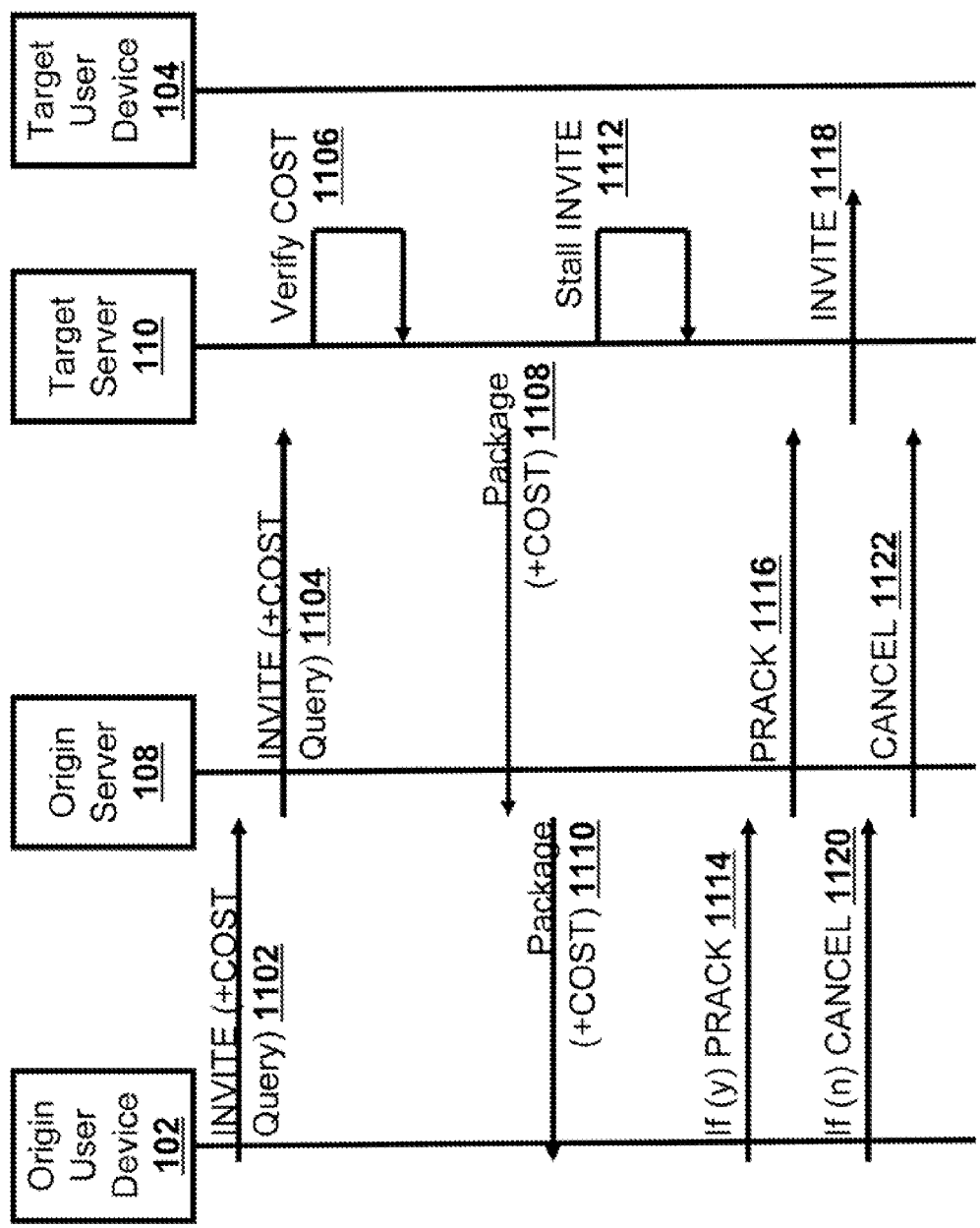
FIG. 11 illustrates, in a block flow diagram, one embodiment of a method for verifying cost during a paused communication connection initiation.

FIG. 11 illustrates, in a block flow diagram, one embodiment of a method for verifying cost during a paused communication connection initiation. The user devices 300 and the network servers 200 may interact using SIP. The origin user device 102 may send an INVITE request to the origin server 108 (Action 1102). The communication connection initiation request may include a pricing plan query, or COST query. The origin user device 102 may have a rule in place that includes the COST query as a standard query with every INVITE request. Alternately, the user may choose to include the COST query on a case by case basis. In another embodiment, the origin user device 102 may send the COST query separately after sending a pause request. The origin 108 server may forward the INVITE request and COST query to the target server 110 (Action 1104). The target server 110 may verify the COST of the target user device 104 (Action 1106). The target server 110 may send the verified COST of the target user device 104 in an information package to the origin server 108 (Action 1108). The origin server 108 may forward the information package to the origin user device 102 (Action 1110). Concurrently, the target server 110 may stall the processing of the INVITE request (Action 1112). After reviewing the information in the information package, the origin user device 102 may send a decision to the origin server 108. The origin user device 102 may send the decision in response to a user input or based on a preset based of decision criteria. The decision criteria may be a default set of decision criteria, a set of decision criteria decided by the user, or other decision criteria. If the origin user device 102 approves of the verified COST of the information package, the origin user device 102 may send a PRACK to the origin server 108 (Action 1114). The origin server 108 may forward the PRACK (to the target server 110 (Action 1116). The target server 110 may forward the INVITE request to the target user device 104 (Action 1118). If the origin user device 102 disapproves of the verified COST of the information package, the origin user device 102 may send a CANCEL request to the origin server 108 (Action 1120). The origin server 108 may forward the CANCEL request to the target server 110 (Action 1122).

Figure 12:
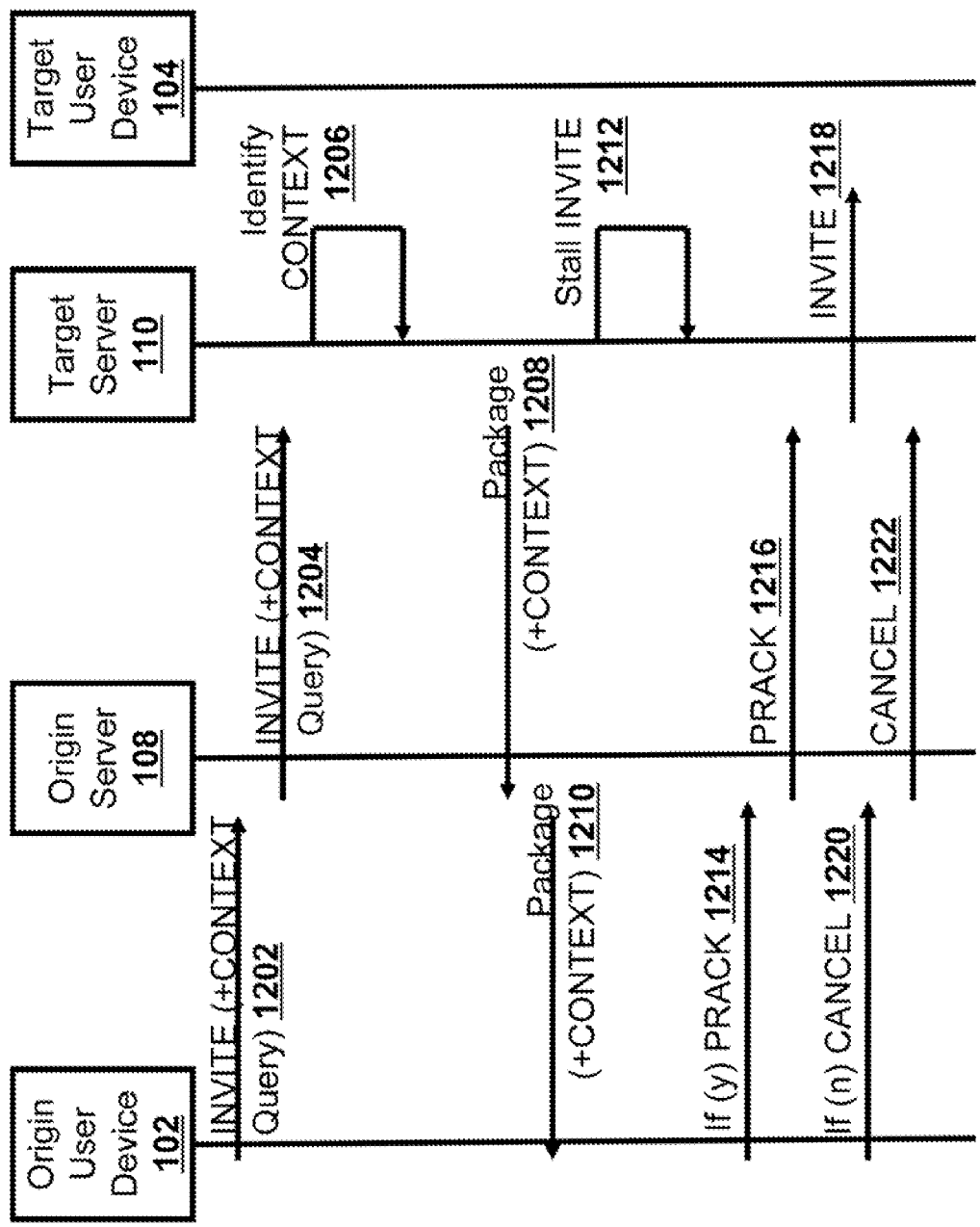
FIG. 12 illustrates, in a block flow diagram, one embodiment of a method for identifying context during a paused communication connection initiation.

FIG. 12 illustrates, in a block flow diagram, one embodiment of a method for identifying context during a paused communication connection initiation. The user devices 300 and the network servers 200 may interact using SIP. The origin user device 102 may send an INVITE request to the origin server 108 (Action 1202). The communication connection initiation request may include a query regarding the target user context, or CONTEXT query. The target user context may be the location of the target user device 104, including the reception zone of the target user device 104; the mode of the target user device, such as ring, vibrate, or silent mode; or a specific user context, such as home, meeting, office, or other context. The origin user device 102 may have a rule in place that includes the CONTEXT query as a standard query with every INVITE request. Alternately, the user may choose to include the CONTEXT query on a case by case basis. In another embodiment, the origin user device 102 may send the CONTEXT query separately after sending a pause request. The origin 108 server may forward the INVITE request and CONTEXT query to the target server 110 (Action 1204). The target server 110 may identify the CONTEXT of the target user device 104 (Action 1206). The target server 110 may identify the target user context based on a user maintained status profile or on a target user device feedback. The target server 110 may send the identified CONTEXT of the target user device 104 in an information package to the origin server 108 (Action 1208). The origin server 108 may forward the information package to the origin user device 102 (Action 1210). Concurrently, the target server 110 may stall the processing of the INVITE request (Action 1212). After reviewing the information in the information package, the origin user device 102 may send a decision to the origin server 108. The origin user device 102 may send the decision in response to a user input or based on a preset based of decision criteria. The decision criteria may be a default set of decision criteria, a set of decision criteria decided by the user, or other decision criteria. If the origin user device 102 wants to proceed based on the target user context, the origin user device 102 may send a PRACK to the origin server 108 (Action 1214). The origin server 108 may forward the PRACK (to the target server 110 (Action 1216). The target server 110 may forward the INVITE request to the target user device 104 (Action 1218). If the origin user device 102 wants to cancel based on the target user context, the origin user device 102 may send a CANCEL request to the origin server 108 (Action 1220). The origin server 108 may forward the CANCEL request to the target server 110 (Action 1222).

Figure 13:
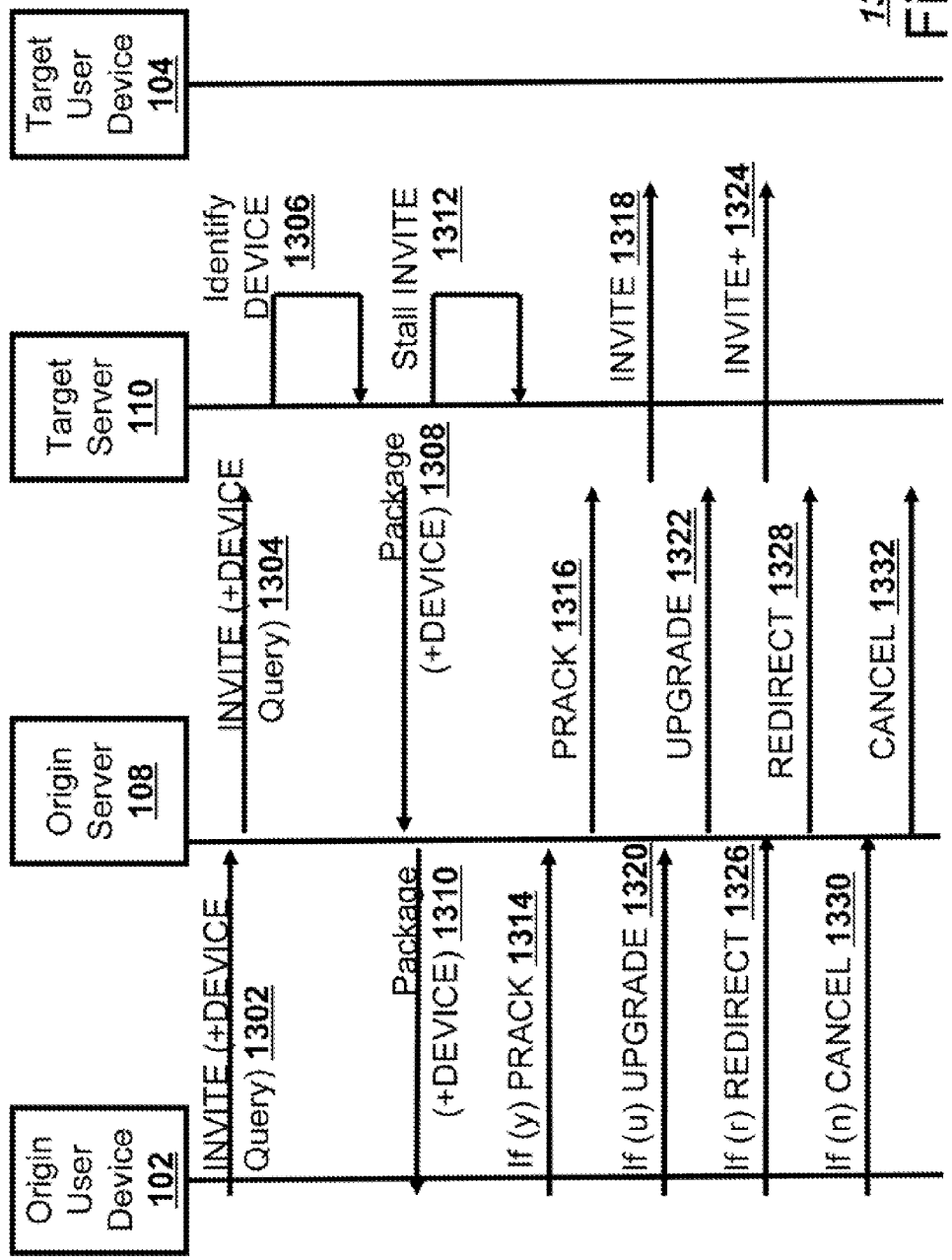
FIG. 13 illustrates, in a block flow diagram, one embodiment of a method for identifying device type during a paused communication connection initiation.

FIG. 13 illustrates, in a block flow diagram, one embodiment of a method for identifying device type during a paused communication connection initiation. The user devices 300 and the network servers 200 may interact using SIP. The origin user device 102 may send an INVITE request to the origin server 108 (Action 1302). The communication connection initiation request may include a device characteristic query, or DEVICE query. The DEVICE query may ask for the capabilities of the target user device 104 to determine if the target user device 104 may handle the communication connection mode, such as text, instant message, audio, video, or other communication connection mode. The origin user device 102 may have a rule in place that includes the DEVICE query as a standard query with every INVITE request. Alternately, the user may choose to include the DEVICE query on a case by case basis. In another embodiment, the origin user device 102 may send the DEVICE query separately after sending a pause request. The origin 108 server may forward the INVITE request and DEVICE query to the target server 110 (Action 1304). The target server 110 may identify the device characteristic of the target user device 104 (Action 1306). The target server 110 may send the identified device characteristic of the target user device 104 in an information package to the origin server 108 (Action 1308). The origin server 108 may forward the information package to the origin user device 102 (Action 1310). Concurrently, the target server 110 may stall the processing of the INVITE request (Action 1312). After reviewing the information in the information package, the origin user device 102 may send a decision to the origin server 108. The origin user device 102 may send the decision in response to a user input or based on a preset based of decision criteria. The decision criteria may be a default set of decision criteria, a set of decision criteria decided by the user, or other decision criteria. If the device characteristic matches the mode of the current communication connection initiation, the origin user device 102 may send a PRACK to the origin server 108 (Action 1314). The origin server 108 may forward the PRACK to the target server 110 (Action 1316). The target server 110 may forward the INVITE request to the target user device 104 (Action 1318). If the device characteristic is capable of a higher mode than the current communication connection initiation, the origin user device 102 may send a request to upgrade the communication mode of the communication connection initiation, or an UPGRADE request, to the origin server 108 (Action 1320). The origin server 108 may forward the UPGRADE request to the target server 110 (Action 1322). The target server 110 may forward an upgraded INVITE request to the target user device 104 (Action 1324). If the target user has a user device with a device characteristic capable of the current communication connection mode or higher, the origin user device 102 may send a request to redirect the communication connection initiation to a different target user device, or a REDIRECT request, to the origin server 108 (Action 1326). The origin server 108 may forward the REDIRECT request to the target server 110 (Action 1328). If the origin user device 102 disapproves the device characteristic for the target user device 104, the origin user device 102 may send a CANCEL request to the origin server 108 (Action 1330). The origin server 108 may forward the CANCEL request to the target server 110 (Action 1332).

Embodiments within the scope of the present invention may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hardwired, wireless, or combination thereof to a computer, the computer properly views the connection as a computer-readable medium. Thus, any such connection is properly termed a computer-readable medium. Combinations of the above should also be included within the scope of the computer-readable media.

Embodiments may also be practiced in distributed computing environments where tasks are performed by local and remote processing devices that are linked (either by hardwired links, wireless links, or by a combination thereof) through a communications network.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Although the above description may contain specific details, they should not be construed as limiting the claims in any way. Other configurations of the described embodiments of the invention are part of the scope of this invention. For example, the principles of the invention may be applied to each individual user where each user may individually deploy such a system. This enables each user to utilize the benefits of the invention even if any one of the large number of possible applications do not need the functionality described herein. In other words, there may be multiple instances of the electronic devices each processing the content in various possible ways. It does not necessarily need to be one system used by all end users. Accordingly, the appended claims and their legal equivalents should only define the invention, rather than any specific examples given.

We claim:

1. A method for creating a communication connection, comprising:
   receiving by an origin server a connection request from an origin user device;
   beginning by the origin server a communication connection initiation between the origin user device and a target user device;
   prior to completing the connection initiation, identifying by the origin server a pause event;
   prior to completing the connection initiation, pausing by the origin server the communication connection initiation in response to the pause event, such that connection initiation does not progress while the connection initiation is paused;
   in response to the pause event, obtaining by the origin server information to send to the origin user device;
   sending the information to the origin user device;
   receiving a connection action from the origin user device, wherein the connection action is one of
      redirect the communication connection initiation to a different target user device; and
      upgrade a communication mode of the communication connection initiation; and
   executing the connection action received from the origin user device.

2. The method of claim 1, wherein the connection request from the origin user device comprises a query for information and wherein pausing the communication connection initiation is based on a user rule.

3. The method of claim 1, wherein pausing the communication connection initiation is performed in response to receiving a pause request from the origin user device.

4. The method of claim 3 wherein before obtaining information to send to the origin user device the method comprises receiving an information query from the origin user device.

5. The method of claim 1, wherein the connection action comprises redirecting the communication connection initiation to the different target user device.

6. The method of claim 1, wherein the connection action comprises upgrading the communication mode of the communication connection initiation.

7. A network server for creating a communication connection, comprising:
   a processor that
      receives a connection request from an origin user device;
      begins a communication connection initiation between the origin user device and a target user device;
      prior to completing the connection initiation, identifies a pause event;
      prior to completing the connection initiation, pauses the communication connection initiation in response to the pause event, such that the connection initiation does not progress while the connection initiation is paused;
      in response to the pause event, obtains information to send to the origin user device; and
   a transceiver that
      sends the information to the origin user device;
      receives a connection action from the origin user device, wherein the connection action is one of
         redirect the communication connection initiation to a different target user device, and
         upgrade a communication mode of the communication connection initiation; and
   wherein the processor executes the connection action received from the origin user device.

8. The network server of claim 7, wherein the connection action from the origin user device comprises a query for information and wherein the processor pauses the communication connection initiation based on a user rule.

9. The network server of claim 7, wherein the processor pauses the communication connection initiation in response to the transceiver receiving a pause request from the origin user device.

10. The network server of claim 9, wherein before the processor obtains information to send to the origin user device the transceiver receives an information query from the origin user device.

11. The network server of claim 7, wherein the connection action comprises redirecting the communication connection initiation to the different target user device.

12. The network server of claim 7, wherein the connection action comprises upgrading the communication mode of the communication connection initiation.

13. A non-transitory computer-readable medium comprising instructions encoded in one or more tangible media for execution by one or more processors to create a communication connection, the instructions when executed by the one or more processors cause the one or more processors to perform operations, comprising:
   receive a connection request from an origin device
   send a communication connection request to a first target device to begin a communication connection initiation;
   prior to completion of the communication connection initiation, identify a pause event;
   prior to completion of the communication connection initiation, pause the communication connection initiation, such that the communication connection initiation does not progress while the communication connection initiation is paused;
   obtain information to send to the origin device in response to the pause event;
   send the information to the origin device;
receive a connection action from the origin device, wherein the connection action is one of redirect the communication connection initiation to a different target device and upgrade a communication mode of the communication connection initiation; and
   execute the one of the connection action.

14. The computer-readable medium of claim 13, wherein the instructions to obtain information comprises instructions to obtain information regarding a pricing plan for a communication session.

15. The computer-readable medium of claim 13, wherein the connection request from the origin device comprises a query for the information.

16. The computer-readable medium of claim 13, wherein the communication connection initiation is paused based on a user rule.

17. The computer-readable medium of claim 13, wherein the instructions to pause the communication connection initiation comprise instructions to pause the communication connection initiation in response to receiving a pause request from the origin device.

18. The computer-readable medium of claim 13, wherein before obtaining information to send to the origin device an information query is received from the origin device.

19. The computer-readable medium of claim 13, wherein the connection action comprises redirecting the communication connection initiation to the different target device.

20. The computer-readable medium of claim 13, wherein the connection action comprises upgrading a communication mode of the connection initiation.

* * * * *